US012600517B2

(12) United States Patent
Holmes

(10) Patent No.: US 12,600,517 B2
(45) Date of Patent: Apr. 14, 2026

(54) AUTOMATIC PACKAGER FOR PHARMACEUTICALS

(71) Applicant: RXSAFE LLC, Vista, CA (US)

(72) Inventor: William K. Holmes, San Diego, CA (US)

(73) Assignee: RXSAFE LLC, Vista, CA (US)

( * ) Notice: Subject to any disclaimer, the term of this patent is extended or adjusted under 35 U.S.C. 154(b) by 0 days.

(21) Appl. No.: 18/883,094

(22) Filed: Sep. 12, 2024

(65) Prior Publication Data

US 2025/0108950 A1 Apr. 3, 2025

Related U.S. Application Data

(60) Provisional application No. 63/586,613, filed on Sep. 29, 2023.

(51) Int. Cl.
| | |
|---|---|
| *B65B 5/02* | (2006.01) |
| *B65B 5/10* | (2006.01) |
| *B65B 57/14* | (2006.01) |
| *B65B 57/18* | (2006.01) |
| *G01V 8/12* | (2006.01) |

(52) U.S. Cl.
CPC .............. *B65B 57/18* (2013.01); *B65B 5/022* (2013.01); *B65B 5/103* (2013.01); *B65B 57/14* (2013.01); *G01V 8/12* (2013.01)

(58) Field of Classification Search
USPC .......................................................... 53/475
See application file for complete search history.

(56) References Cited

U.S. PATENT DOCUMENTS

| | | | |
|---|---|---|---|
| 11,753,193 B2 | 9/2023 | Holmes | |
| 2004/0128955 A1 | 7/2004 | Aylward | |
| 2010/0332021 A1 | 12/2010 | Rivenbark, Jr. | |
| 2020/0346793 A1* | 11/2020 | Holmes | B65B 5/103 |
| 2020/0404196 A1* | 12/2020 | Holmes | G07F 11/44 |

FOREIGN PATENT DOCUMENTS

| | | |
|---|---|---|
| CN | 104144857 A | 11/2014 |

OTHER PUBLICATIONS

European Patent Office. Extended European Search Report for Application No. 24201204.5, dated Mar. 11, 2025 (10 pages).

* cited by examiner

*Primary Examiner* — Chinyere J Rushing-Tucker
(74) *Attorney, Agent, or Firm* — Michael Best & Friedrich LLP

(57) ABSTRACT

An automatic packager for pharmaceuticals including a receptacle configured to receive a plurality of pharmaceuticals and a plunger configured to be movable between a lowered position and a raised and defining a path therebetween. The automatic packager also includes a sensor configured to detect an obstruction in the path and an electronic processor configured to dispense pharmaceuticals for a pouch to the receptacle based on prescription information and move the plunger to the raised position to deliver the pharmaceuticals to the pouch. The electronic processor is also configured to determine, using the sensor, whether an obstruction is present in the path and move the plunger to the lowered position in response to determining the obstruction is not present in the receptacle. The electronic processor is also configured to provide an alert in response to determining that the obstruction is present in the path.

17 Claims, 9 Drawing Sheets

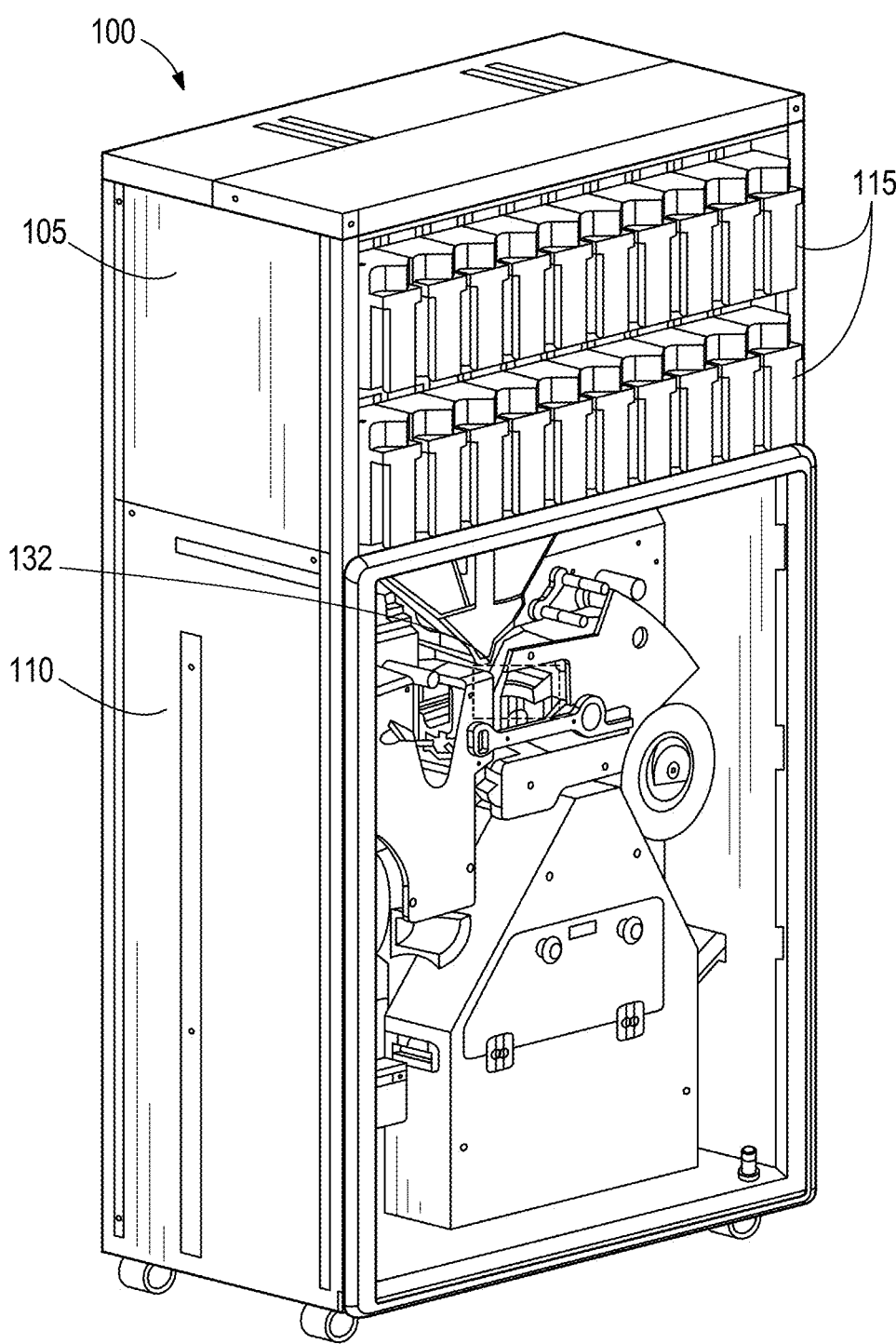
_FIG. 1_

AUTOMATIC PACKAGER FOR PHARMACEUTICALS

CROSS REFERENCE TO RELATED APPLICATIONS

This application claims priority to U.S. Provisional Patent Application No. 63/586,613 filed Sep. 29, 2023, the entire content of which is incorporated herein by reference.

SUMMARY

One embodiment provides an automatic packager for pharmaceuticals including a receptacle configured to receive a plurality of pharmaceuticals and a plunger disposed adjacent the receptacle and configured to be movable between a lowered position and a raised position through the receptacle. The plunger defines a path between the lowered position and the raised position. The automatic packager also includes a sensor configured to detect an obstruction in the path and an electronic processor electrically coupled to the plunger and the sensor. The electronic processor is configured to dispense pharmaceuticals for a pouch to the receptacle based on prescription information and move the plunger to the raised position to deliver the pharmaceuticals to the pouch. The electronic processor is also configured to determine, using the sensor, whether an obstruction is present in the path and move the plunger to the lowered position in response to determining the obstruction is not present in the receptacle. The electronic processor is also configured to provide an alert in response to determining that the obstruction is present in the path.

Another embodiment provides an automatic packager for pharmaceuticals including a plurality of cartridges configured to dispense a plurality of pharmaceuticals. The automatic packager also includes a receptacle configured to receive the plurality of pharmaceuticals from the plurality of cartridges, a packaging unit configured to receive the plurality of pharmaceuticals from the receptacle and form a pouch and a valve mechanism adjacent to the receptacle configured to selectively block a path between the receptacle and the packaging unit, a sensor configured to detect an obstruction in the path. The automatic packager further includes an electronic controller in communication with the sensor and the valve mechanism configured to provide an alert in response to determining that an obstruction is present in the path.

Another embodiment provides to a method for packaging medications using an automatic packager including providing a packaging unit of the automatic packager, the packaging unit including a receptacle configured to receive a plurality of pharmaceuticals, providing a plunger disposed movable between a lowered position and a raised position through the receptacle, the plunger defining a path between the lowered position and the raised position, providing a sensor configured to detect an obstruction in the path; dispensing pharmaceuticals for a pouch, using the packaging unit, to the receptacle based on prescription information, moving the plunger to the raised position to deliver the pharmaceuticals to the pouch, determining, using the sensor, whether the obstruction is present in the path, moving the plunger to the lowered position in response to determining the obstruction is not present in the receptacle, and providing an alert in response to determining that the obstruction is present in the path.

BRIEF DESCRIPTION OF THE DRAWINGS

FIG. 1 is a front perspective view of an automatic packager in according with some embodiments.

DETAILED DESCRIPTION

Figure 2:
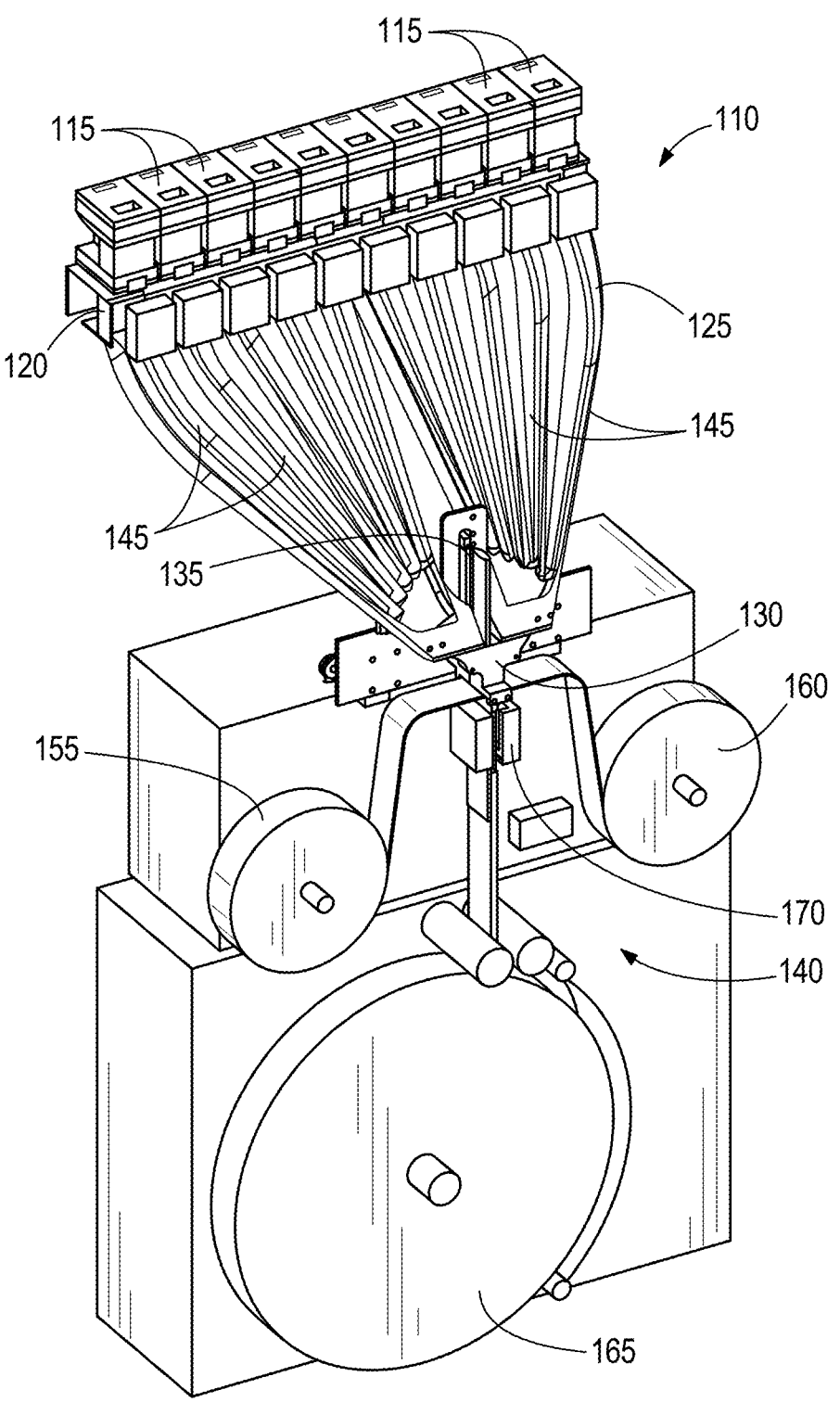
FIG. 2 is a perspective view of a packaging unit of the automatic packager of FIG. 1 in accordance with some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIG. 1 illustrates an example automatic packager 100 including a universal feed cassette 105 and a packaging unit 110. The universal feed cassette 105 receives a plurality of cartridges 115 that may be arranged in a single row or multiple rows. In the example illustrated, the universal feed cassette 105 receives twenty cartridges 115 in two rows. In other examples, the universal feed cassette may receive a different number of cartridges 115 in a different configuration. The universal feed cassette 105 includes openings at the bottom of the housing of the universal feed cassette 105 to dispense pharmaceuticals from the cartridges 115 to the packaging unit 110. Each opening of the universal feed cassette 105 may correspond to one or more cartridges 115 provided above the opening. In the arrangements illustrated in FIG. 1 including the universal feed cassettes 105, the automatic packager 100 may be used to dispense and package twenty different pills at the same time. In other examples, the automatic packager 100 may be used to dispense and package up to forty or more pills at the same time. In the example illustrated in FIG. 1, the packaging unit 110 is a strip packager. The packaging unit 110 receives the pills from the universal feed cassette 105 and packages the received pills into pouch packages to be provided to the consumer. FIG. 1 illustrates only example embodiment of an automatic packager 100. The automatic packager 100 may include more or fewer components than those illustrated in FIG. 1 and may perform functions other than those explicitly described herein.

Each cartridge 115 is filled with a single type of pharmaceutical from a bulk container. A bulk container is a container of a single type of pharmaceutical provided by a distributer of pharmaceuticals to pharmacies and health care facilities. Bulk containers do not include a mechanized dispensing mechanism to individually dispense pharmaceuticals. A pharmacist or technician fills the cartridges 115 with pharmaceuticals from the bulk containers. The cartridges

115 include a mechanism to individually dispense pharmaceuticals from the cartridge 115. In one example, the cartridge 115 includes slots that receive a single unit of pharmaceuticals. A mechanism of the cartridge 115 is then operated to sequentially dispense individual pharmaceuticals from the cartridge 115. In another example, the cartridge 115 includes a singulating mechanism to singulate pharmaceuticals from a reservoir of pharmaceuticals. The singulating mechanism picks up a single unit of pharmaceuticals from a plurality of a single type of pharmaceuticals provided in the reservoir of the cartridge 115.

FIGS. 2-6 illustrate one embodiment of a packaging unit 110 for use with the automatic packager 100. In the example illustrated, the packaging unit 110 includes a base 120, a manifold 125, a receptacle 130, a valve mechanism 135, and packaging equipment 140. As shown in FIG. 2, the base 120 may support the universal feed cassette 105 and the cartridges 115 of the universal feed cassette 105 and includes openings that correspond to openings of the universal feed cassette 105. When the pharmaceuticals are dispensed from the cartridges 115, the pharmaceuticals pass through the respective openings of the universal feed cassette and the base 120 into the manifold 125.

The manifold 125 includes a plurality of discrete tracks 145 corresponding to each of the cartridges 115 or openings of the universal feed cassette 105 mounted on the base 120. The illustrated tracks 145 are independent channels that together form the manifold 125. The tracks 145 isolate the pharmaceuticals from each other as the pharmaceuticals slide down the manifold 125 to the receptacle 130. The tracks 145 converge toward the receptacle 130 to provide the pharmaceuticals as a group to the receptacle 130.

Figure 3:
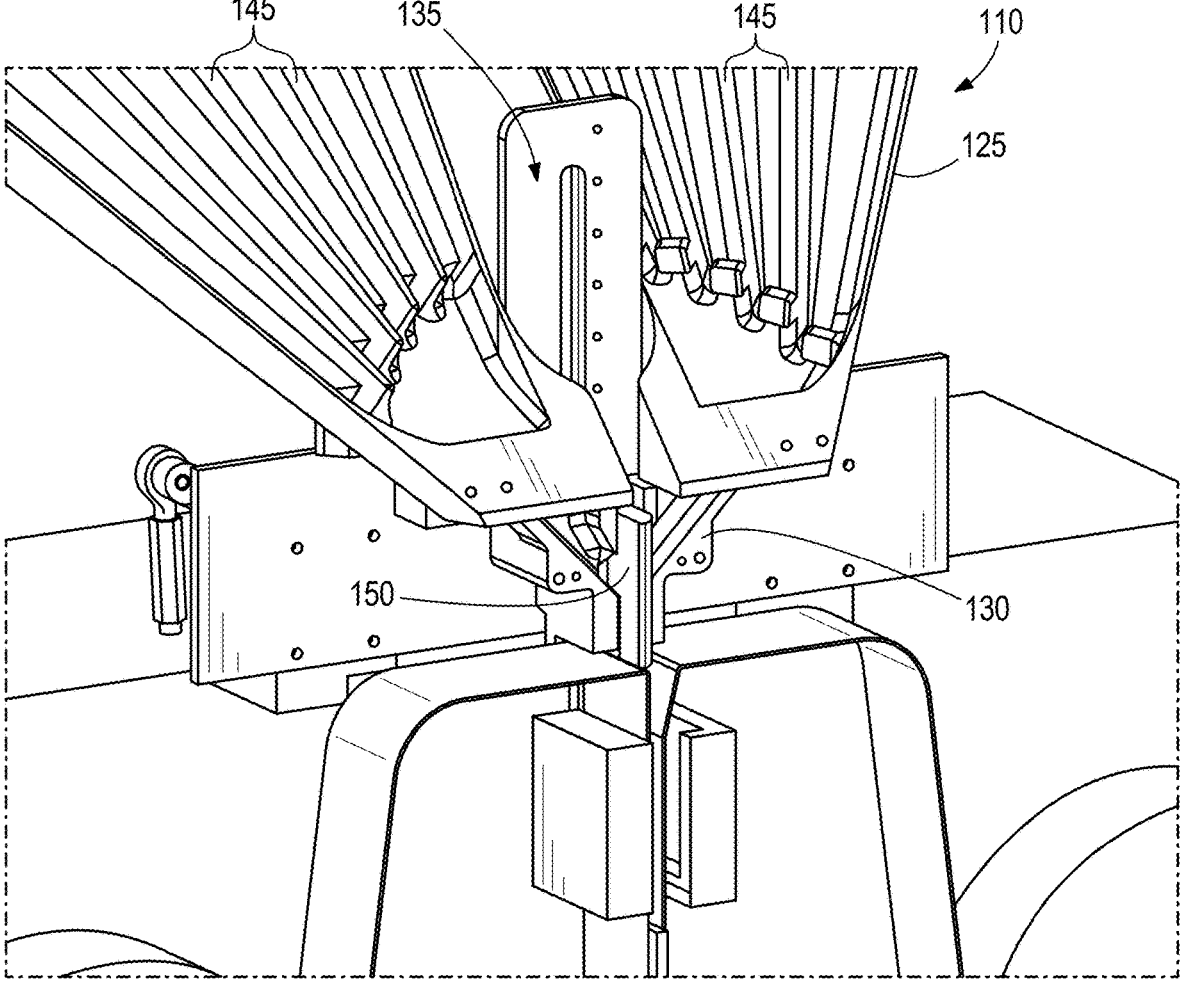
FIGS. 3-5 illustrate a portion of the packaging unit of FIG. 2 including a manifold, a receptacle, and a valve mechanism in accordance with some embodiments.
Figure 4:
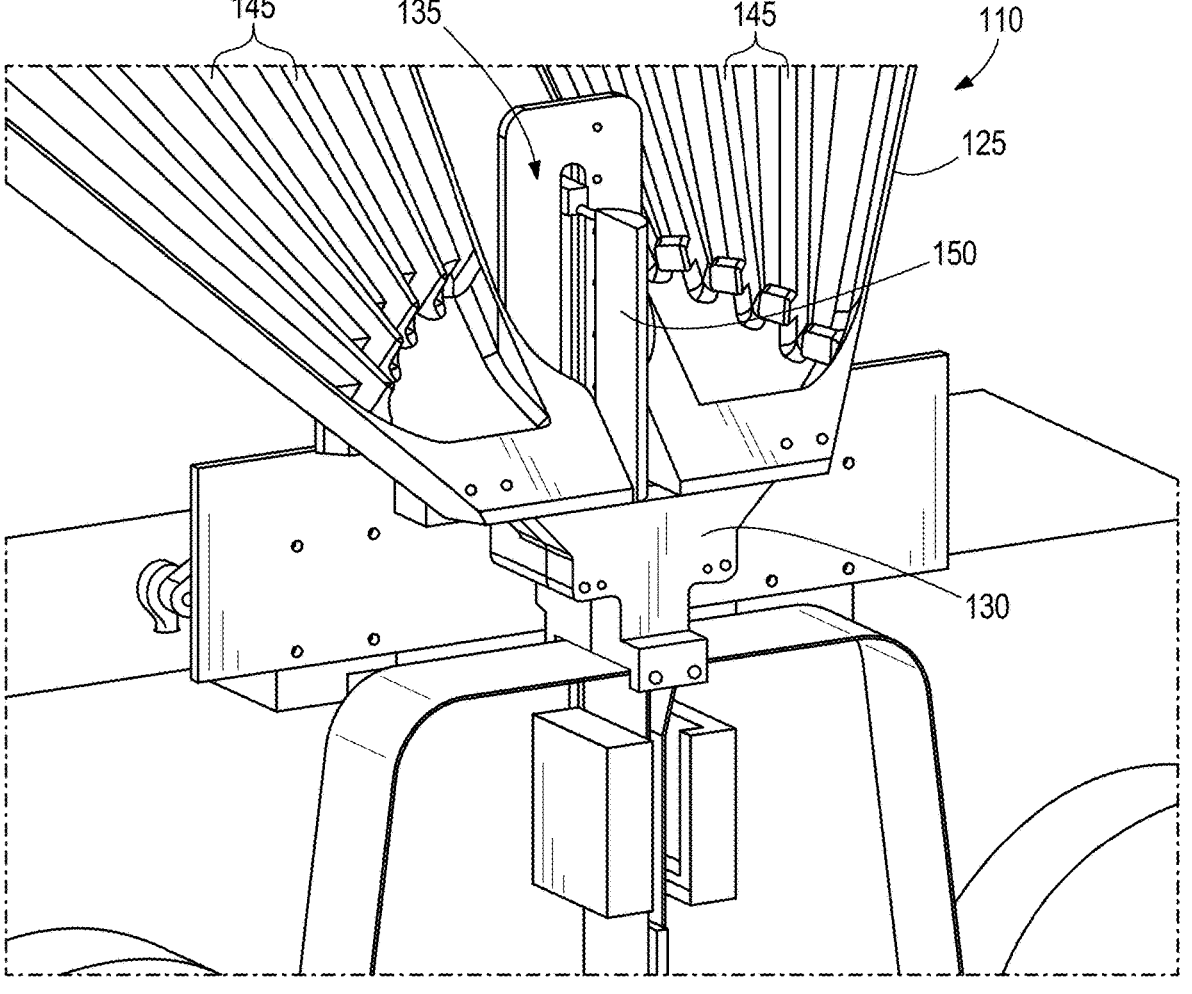

As shown in FIGS. 3-4, the receptacle 130 receives the pharmaceuticals from each of the tracks 145 in the manifold 125. The pharmaceuticals received at the receptacle typically include a plurality of types of pharmaceuticals needed to fill a single administration pouch package. A single administration pouch package is a pouch package that includes all or part of the pharmaceuticals that are to be taken at or during a single administration time, for example, morning, afternoon, evening, etc. The receptacle 130 has a funnel shape with the top of the funnel being wider than the base of the funnel. The top of the receptacle 130 provided under (or downstream of) the converged tracks 145 and is open to receive the pharmaceuticals from the tracks 145. The base of the receptacle 130 is provided above (or upstream) of a pouch package formed by the packaging equipment 140 and includes a narrow opening to provide the pharmaceuticals into the pouch package.

A shutter or valve mechanism 135 including a pushrod or plunger 150 is provided adjacent the receptacle 130. In the example illustrated, the valve mechanism 135 is provided in the center of the manifold 125 and the receptacle 130. The valve mechanism 135 bifurcates the tracks 145 such that a first subset of the plurality of tracks 145 is provided on a first side (e.g., a left side) of the valve mechanism 135 and a second subset of the plurality of tracks 145 is provided on a second side (e.g., a right side) of the valve mechanism 135.

The plunger 150 is movable between a first or lowered position (shown in FIG. 3) and a second or raised position (shown in FIG. 4) defining a path therebetween. Referring to FIG. 3, when in the lowered position, a bottom end of the plunger 150 is positioned at or below the opening in the base of the receptacle 130. In this position, the plunger 150c blocks the opening in the base of the receptacle 130 such that any pharmaceuticals in the receptacle cannot flow out of the base of the receptacle 130. Referring to FIG. 4, when in the raised position, a bottom end of the plunger 150 is positioned above the opening in the base of the receptacle 130. In this position, the plunger 150 does not block the opening in the base of the receptacle 130 such that any pharmaceuticals in the receptacle can freely flow out of the base of the receptacle 130 toward the packaging equipment 140. The valve mechanism 135 may include a solenoid or other suitable actuator to raise and lower the plunger 150.

The packaging equipment 140 is used to form the strip of pouch packages that are used to package the pharmaceuticals dispensed from the universal feed cassette 105 according to one or more prescriptions. In the example illustrated, the packaging equipment 140 includes two feed stock rolls 155, 160 and a take-up roll 165. The feed stock rolls 155, 160 release materials to form a pouch under the receptacle 130. A sealing mechanism 170 is used to seal the materials released by the feed stock rolls 155, 160. The take-up roll 165 forms a roll of packaged pouch packages. In one example, a single feed stock roll may be used to form the pouches. In this example, the material released from the feed stock roll is folded in half to form the pouch, which is then sealed by the sealing mechanism 170. The sealing mechanism 170 includes, for example, a heat seal to seal the pouches after the pharmaceuticals are delivered to the pouches. The sealing mechanism 170 may also include a serrating mechanism to serrate the pouches after the pouches are sealed.

During operation, the plunger 150 is initially in the lowered position (FIG. 3) to temporarily stop the pharmaceuticals. The plunger 150 remains in this position until all the requested pharmaceuticals are gathered in the receptacle 130. If an excess or incorrect pharmaceutical is dispensed from the universal feed cassette 105, a gust of air, deflector, or trapdoor may be employed to remove that pharmaceutical from the receptacle 130 or from the manifold 125 before the pharmaceutical reaches the receptacle 130. In some embodiments, the automatic packager 100 may include a slot or window 132 (FIG. 1) to allow an operator to manually clear the obstruction. Once the proper pharmaceuticals are within the receptacle 130, the plunger 150 is actuated to the raised position (FIG. 4) such that the pharmaceuticals can be packaged in a pouch. The plunger 150 is then re-actuated to the lowered position to help push the pharmaceuticals into the pouch and await the next batch of pharmaceuticals. During normal operation, the pharmaceuticals are movable within the receptacle 130 and are pushed into the pouch when the plunger 150 is re-actuated to the lowered position. However, in some circumstances, one or more pharmaceuticals may be caught at the base of the receptacle 130 and unable be moved by the plunger 150 into the pouch. When a pharmaceutical is trapped within the receptacle 130 and is present in the path of the plunger 150 as the plunger 150 moves from the upper position to the lower position, actuating the plunger 150 to the lowered position may break or shatter the pharmaceutical. Accordingly, breaking the pharmaceutical may contaminate the automatic packager 100, clog portions of the valve mechanism 135, damage the material used to form the pouch, and result in an incorrect amount of pharmaceuticals being dispensed within the pouch.

Figure 5:
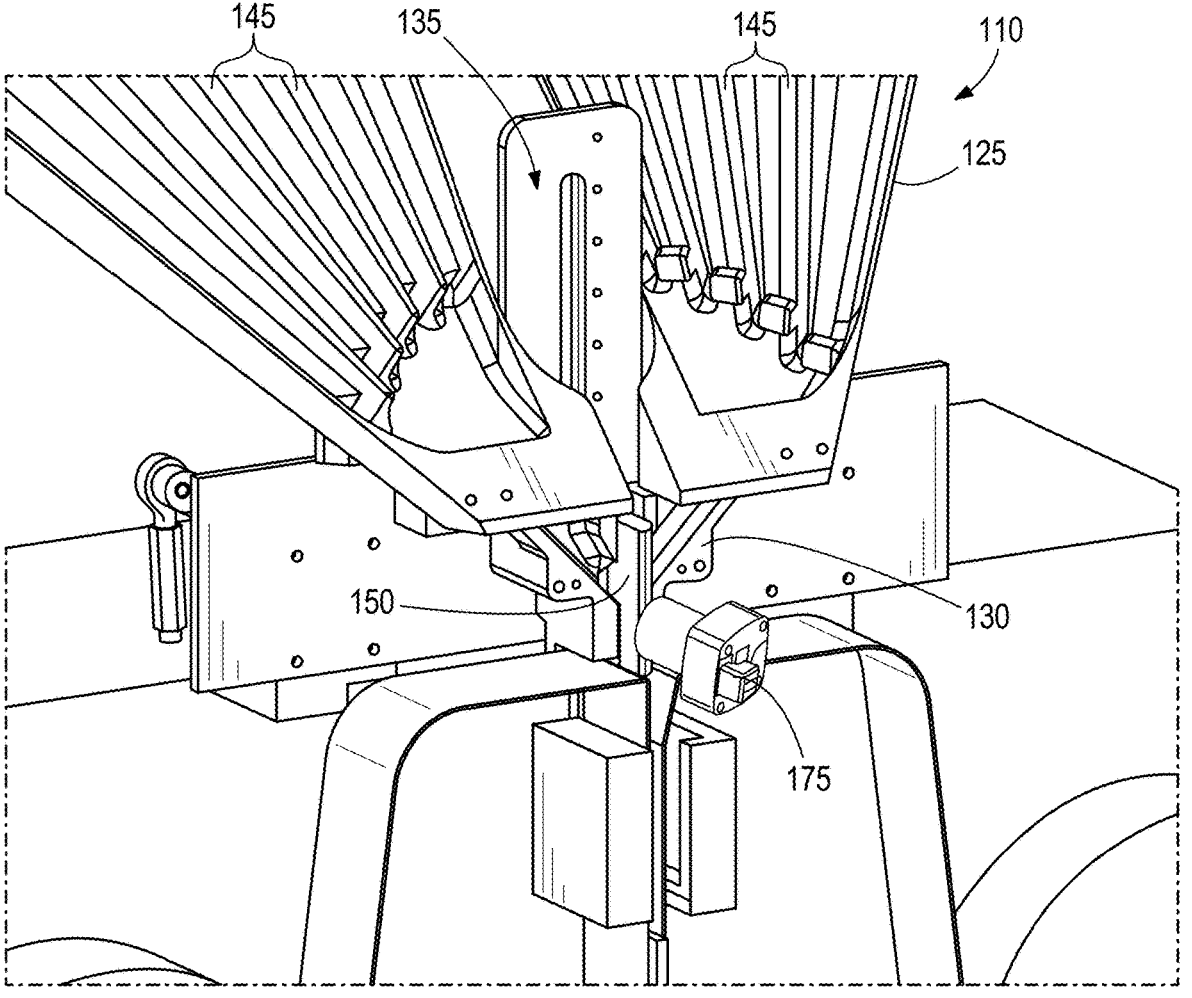

As shown in FIG. 5, the packaging unit 110 may include a sensor 175 facing the receptacle 130. The sensor 175 is positioned such that the contents of the receptacle 130 are within the field of view of the sensor 175. In the example illustrated, the sensor 175 is an image sensor (for example, a camera). The camera may capture image data of the path of the plunger 150 as the plunger 150 is actuated from the raised position to the lowered position. The image data may include images or video of the receptacle 130, or an abstraction of the images or video taken by the camera.

In some embodiments, the sensor 175 may be supported within the receptacle 130. In other embodiments, the sensor 175 may be supported outside the receptacle 130 and the receptacle 130 may be modified (e.g., using a transparent receptacle cover or housing) such the sensor 175 may still determine whether an obstruction is present within the receptacle 130. The sensor 175 may be positioned, for example, on a front side or a back side of the receptacle 130. The packaging unit 110 may also include a light source (not labeled) in order to illuminate the receptacle 130 to improve the image quality of the camera. In some embodiments, the sensor 175 may include an optical sensor, an infrared sensor, an ultrasonic sensor, a time of flight sensor/camera, or the like. In some embodiments, multiple cameras and/or multiple sensors may be incorporated in order to detect the obstruction. In yet other embodiments, the sensor 175 may be disposed and/or oriented to view a different angle of the receptacle 130.

As discussed in further detail, upon detecting an obstruction in the packaging unit 110, the plunger 150 is inhibited from actuating, the user is alerted, and the obstruction is cleared. In some embodiments, the obstruction is cleared automatically without needing any user input. In some embodiments, the obstruction is cleared manually by the user.

Figures 6, 7:
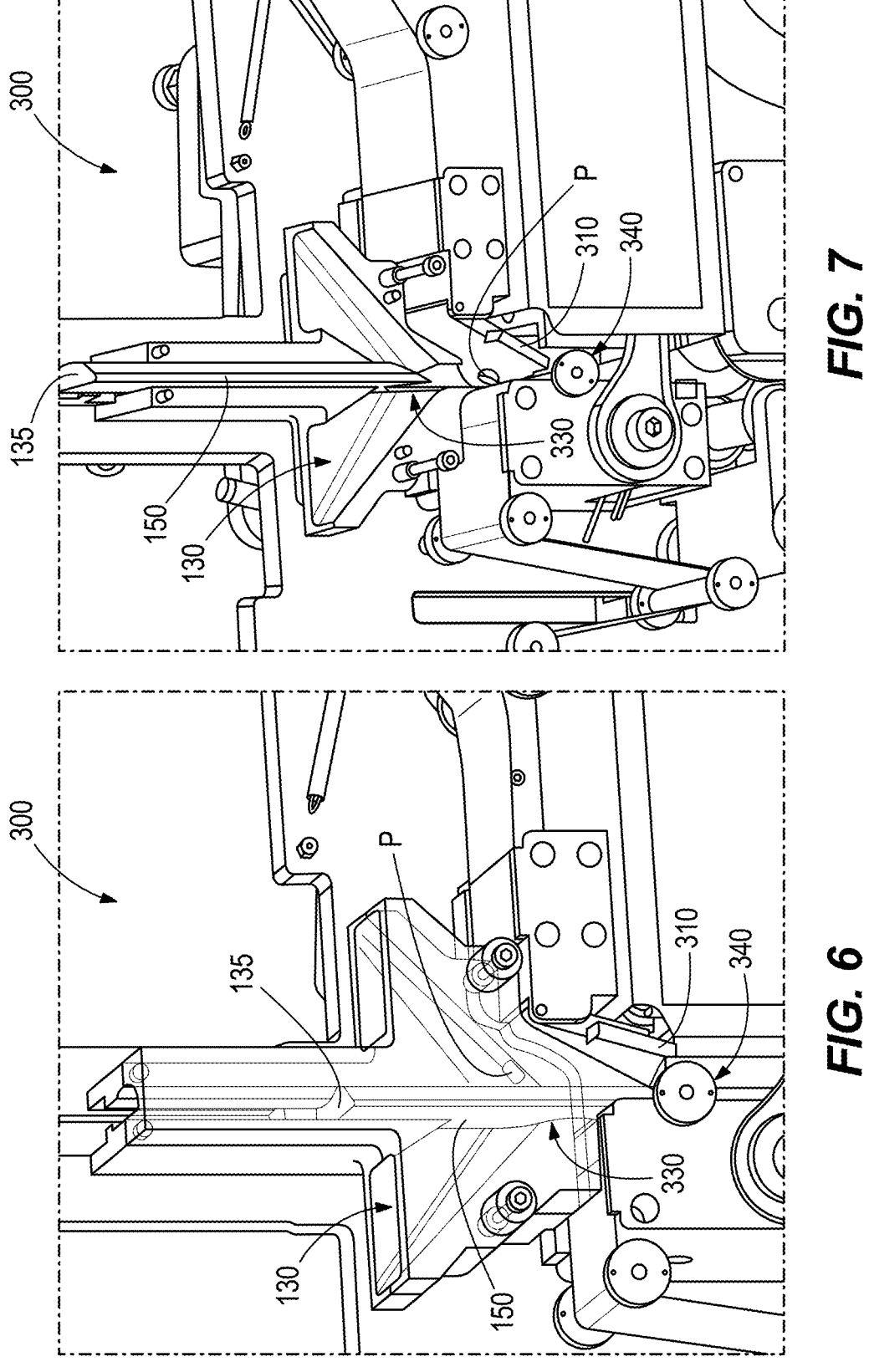
FIG. 6 illustrates a portion of the packaging unit of FIG. 2, including a valve mechanism in a first position in accordance with some embodiments.
FIG. 7 illustrates a portion of the packaging unit of FIG. 2 with the valve mechanism in a second position in accordance with some embodiments.

FIGS. 6 and 7 illustrate a portion of a packaging unit 300 for use with the automatic packager 100 according to another example embodiment. The packaging unit 300 is similar to the packaging unit 110 discussed above. Reference is hereby made to the description of the packaging unit 110 above for description of features and elements of the packaging unit 300 not specifically discussed below.

In the example illustrated, a flapper 310 is provided below (or downstream of) the receptacle 130. The flapper 310 helps manage a material being released by the feed stock rolls of the packaging equipment 140 to form pouches. In addition, the flapper 310 helps hold edges of the material close to each other for sealing. In some embodiments, the flapper 310 may also selectively block the path 330 between the receptacle 130 and the packaging equipment 140. When the plunger 150 is in the raised position (FIG. 6), the flapper 310 extends into the path 330 between the receptacle 130 and the packaging equipment 140. In this position, the pharmaceuticals are held above a pouch before the pharmaceuticals are loaded into the pouch. When the plunger 150 is in the lowered position (FIG. 7), the flapper 310 is moved out of the path 330, allowing the plunger 150 to extend through the path 330. If a pharmaceutical was being held on the flapper 310 before the plunger 150 is moved to the lowered position, the pharmaceutical is also forced by the plunger 150 into the pouch formed by the packaging equipment 140. When the plunger 150 is moved back to the raised position, the leading edge of the flapper 310 pushes the two halves of the pouch (i.e., the two strips of material) flat against each other.

In some embodiments, the flapper 310 may include a carve-out or recess along its leading edge. The carve-out may generally match the shape and contour of the plunger 150. The carve-out provides a hole for pharmaceuticals to move into a pouch without being blocked by the flapper 310. In such embodiments, the flapper 310 does not pinch the two sides of the pouch tight against each other along an entire edge, but only pushes the two side edges of the pouch close together so the upper edge of the pouch can be closed.

In some embodiments, the flapper 310 may include a protrusion or extension along portions of the flapper's 310 leading edge. The protrusion may be configured to be received by portions of the receptacle 130 to push the obstruction (e.g., pill P). The packaging unit 300 may additionally or alternatively use a gust of air, an arm or brush located in the receptacle, vibrate the receptacle 130, or use another mechanical means to remove the receptacle without user intervention.

In the example illustrated, the packaging unit 300 also include a deflator 340 downstream of the receptacle 130. The deflator 340 is configured to remove air from a pouch that is filled with pharmaceuticals. Accordingly, in some embodiments, the deflator 340 includes a sponge that moves up and down to push air out of the pouch. The sponge is elastically deformable in order to aide in removing air from the pouch without puncturing or pushing the pharmaceuticals out of the pouch. The sponge may be composed materials typical of sponges (e.g., polyester, polyurethane, cellulose, wood fibers, etc.). In other embodiments, the deflator 340 may include a roller or vacuum. In some embodiments, the deflator 340 is disposed adjacent to the flapper 310. In other embodiments, the deflator 340 is disposed below the flapper 310.

Figure 8:
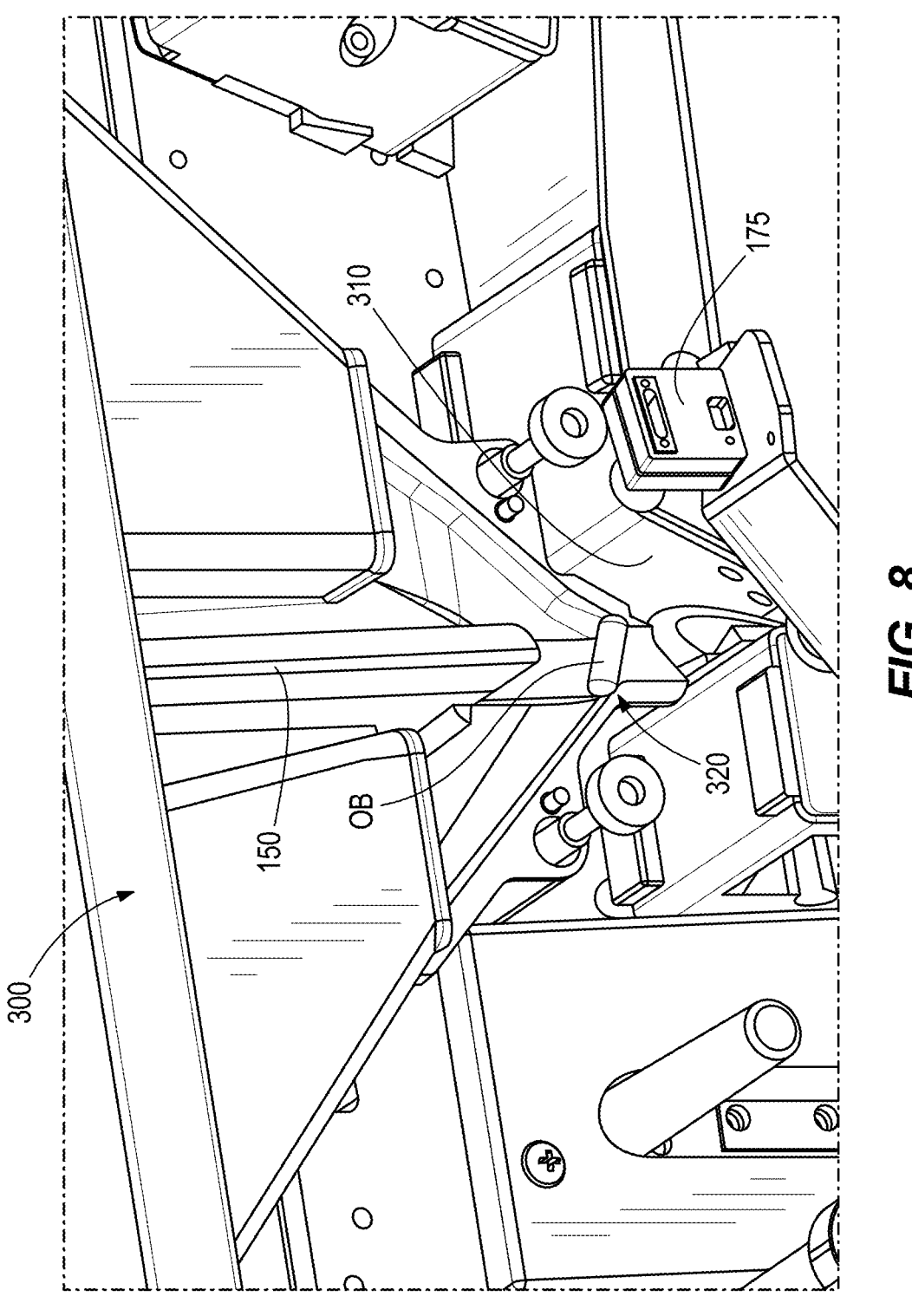
FIG. 8 illustrates a portion of the packaging unit of FIG. 2 including a camera in accordance with some embodiments.

FIG. 8 illustrates the packaging unit 300 further including the sensor 175 (for example, a camera) and an exemplary obstruction OB. In the illustrated embodiment, the sensor 175 is mounted outside the receptacle 130 and disposed above the pouch by a support arm 350 extending from the packaging unit 300. The sensor 175 is angled toward the base of the receptacle 130 and configured to detect an obstruction OB located at the base of the receptacle 130 or just above the pouch. In some embodiments, the sensor 175 may be disposed in other areas of the packaging unit 300 inside or outside the receptacle 130. In other embodiments, the sensor 175 may be oriented and configured to view other portions of the receptacle 130.

Figure 9:
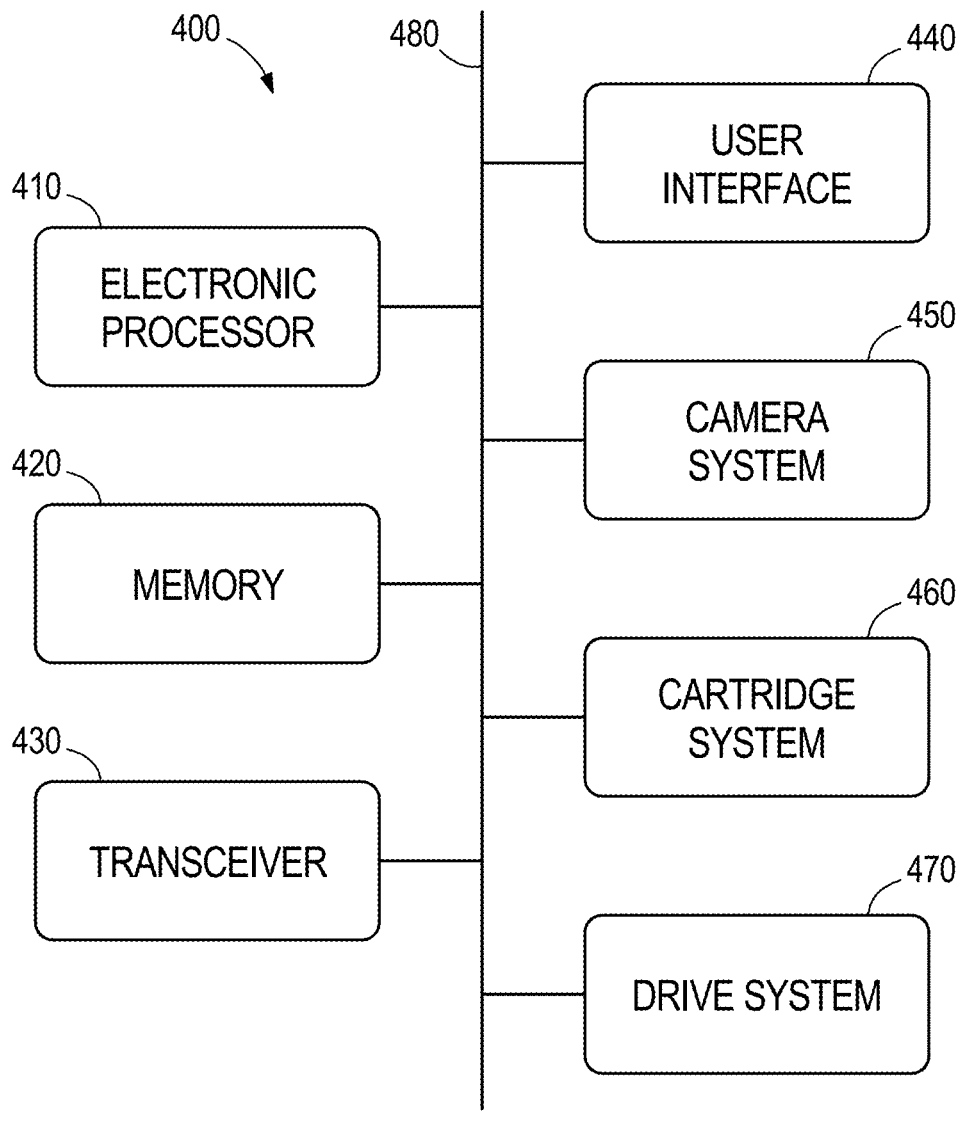
FIG. 9 is a simplified block diagram of a control system of the automatic packager of FIG. 1 in accordance with some embodiments.

FIG. 9 illustrates one example embodiment of a control system 400 for the automatic packager 100. In the example illustrated, the control system 400 includes an electronic processor 410, a memory 420, a transceiver 430, an input/output interface 440, a camera system 450, a cartridge system 460, and a drive system 470. The electronic processor 410, the memory 420, the transceiver 430, the input/output interface 440, the camera system 450, the cartridge system 460, and the drive system 470 are electrically coupled to one another and communicate over one or more control and/or data buses (e.g., a communication bus 480). FIG. 9 illustrates only one embodiment of a control system 400. The control system 400 may include more or fewer components and may perform functions other than those explicitly described herein.

In some embodiments, the electronic processor 410 is implemented as a microprocessor with separate memory, such as the memory 420. In other embodiments, the electronic processor 410 may be implemented as a microcontroller (with memory 420 on the same chip). In other embodiments, the electronic processor 410 may be implemented using multiple processors. In addition, the electronic processor 410 may be implemented partially or entirely as, for example, a field-programmable gate array (FPGA), an application specific integrated circuit (ASIC), and the like, and the memory 420 may not be needed or be modified accordingly. In the example illustrated, the memory 420 includes non-transitory, computer-readable memory that stores instructions that are received and executed by the electronic processor 410 to carry out functionality of the control system 400 described herein. The memory 420 may include, for example, a program storage area and a data storage area. The program storage area and the data storage area may include combinations of different types of memory, such as read-only memory and random-access memory.

The transceiver 430 enables wireless communication from the control system 400 to, for example, a remote electronic device such as a server or a smart telephone or a tablet computer of a remote pharmacist. In other embodiments, rather than the transceiver 430, the control system 400 may include separate transmitting and receiving components, for example, a transmitter and a receiver. In yet other embodiments, the control system 400 may not include a transceiver 430 and may communicate with a remote device via a network interface and a wired connection to a communication network such as the Internet.

The input/output interface 440 (e.g., user interface) may include one or more input mechanisms (e.g., a touch screen, a keypad, a button, a knob, and the like), one or more output mechanisms (e.g., a display, a printer, a speaker, and the like), or a combination thereof. The input/output interface 440 receives input from the input devices actuated by a user, and provides output to the output devices with which a user interacts. For example, the input/output interface 440 may send an alert to the user upon detecting an obstruction. In some embodiments, as an alternative or in addition to managing inputs and outputs through the input/output interface 440, the control system 400 may receive user inputs, provide user outputs, or both by communicating with an external device, such as a console computer, over a wired or wireless connection.

The camera system 450 may include one or more cameras (for example, the sensor 175), one or more light sources or a combination thereof. The camera system 450 illuminates a portion of the automatic packager 100 and subsequently captures an image of that portion of the automatic packager 100. The camera system 450 may communicate with the electronic processor 410 through the bus 425, or through the transceiver 430. In some embodiments, the camera system 450 may interface with the memory to store or access image data. In some embodiments, the camera system 450 may be replaced by or incorporate additional sensors configured to detect an obstruction. In some embodiments, when a different type of sensor 175 is used, the electronic processor 410 may communicate with the sensor 175 to obtain the corresponding sensor data related to an obstruction in the path of the plunger 150.

The drive system 470 controls actuators that are configured to actuate the plunger 150 the flapper 310, the feed stock rolls 155, 160, the take-up roll 165, the deflator 340, and any of the mechanical means used to remove a detected obstacle. Specifically, the drive system 470 may be configured to interrupt any of the plunger 150, the flapper 310, and the feed stock rolls 155, 160 upon receiving a signal from the electronic processor 410. The actuators may include a solenoid, a motor or the like configured to actuate the various features of the automatic packager 100. The drive system 470 may include electronic components to control the actuators.

Figure 10:
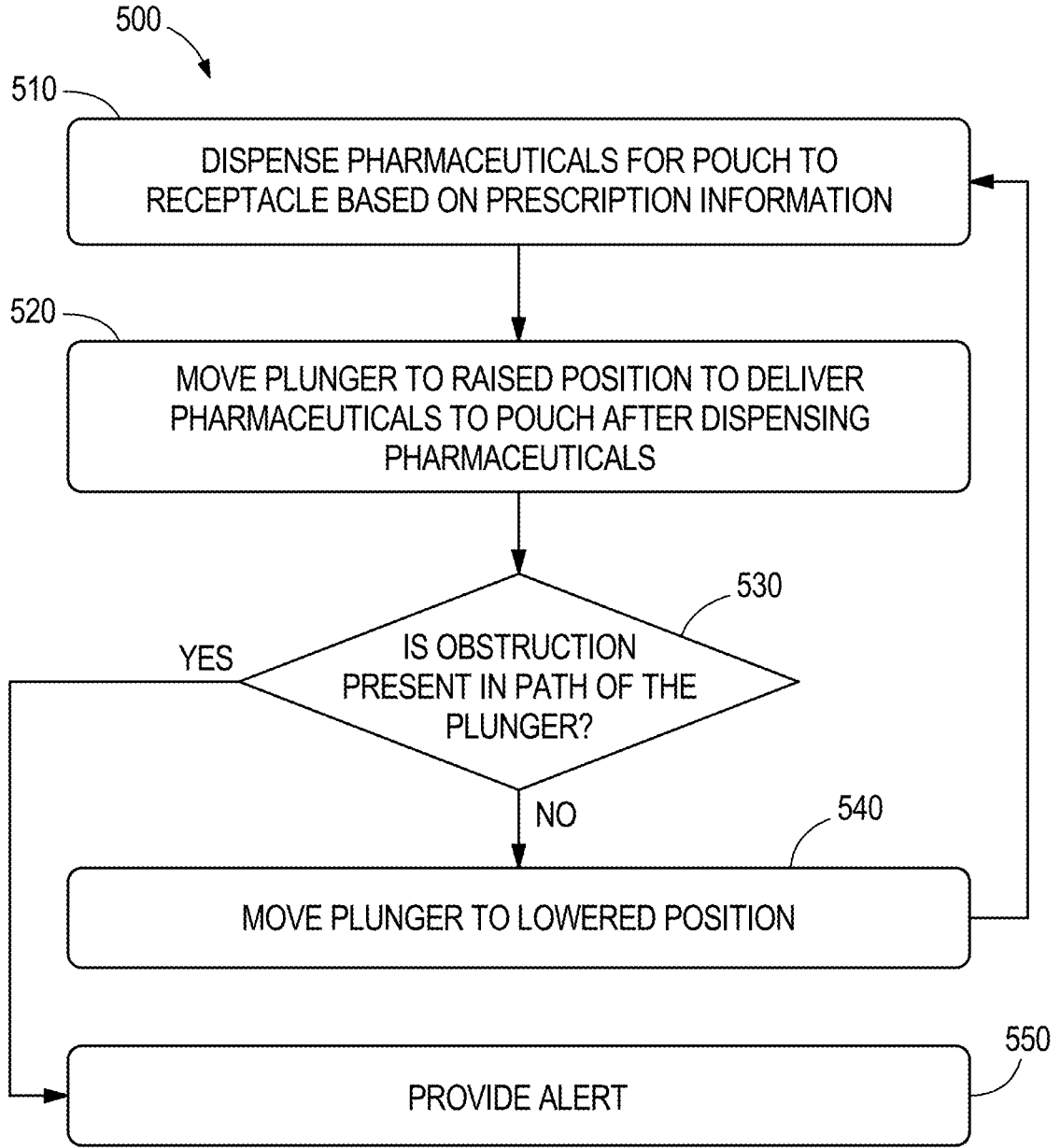
FIG. 10 is a flowchart of a method for packaging pharmaceuticals using the automatic packager of FIG. 1 in accordance with some embodiments.

FIG. 10 is a flowchart of one example method 500 for packaging pharmaceuticals using the automatic packager 100 in accordance with some embodiments. Although the illustrated method 500 includes a number of exemplary steps, not all of the steps need to be performed in every scenario. In some embodiments, a method of packaging pharmaceuticals using the automatic packager 100 may only include a subset of the steps identified in the flowchart. In addition, some methods may include additional steps.

The method 500 includes dispensing pharmaceuticals for a pouch to the receptacle 130 based on prescription information (at block 510). A pharmacist or technician can interact with the packaging unit 110, 300 through the control system 400 to input patient information, facility information, and/or the prescription information. The control system 400 controls the universal feed cassette 105 or the cartridges 115 to individually dispense, or singulate, pharmaceuticals to the packaging unit 110, 300 based on the prescription information. The control system 400 may lower the plunger 150 prior to dispensing the pharmaceuticals such that the pharmaceuticals collect in the receptacle 130 before being delivered to the pouch. The pharmaceuticals may correspond to a single administration pouch.

The method 500 includes moving the plunger 150 to the raised position to deliver the pharmaceuticals to the pouch after dispensing the pharmaceuticals (at block 520). The control system 400 controls the plunger 150 to move to the raised position to deliver the pharmaceuticals collected in the receptacle 130 to the pouch. The plunger 150 may be raised in response to determining that all the pharmaceuticals for the pouch have been dispensed from the cartridges 115.

The method 500 includes determining, using the sensor 175 and/or the camera system 450, whether an obstruction is present in the path of the plunger 150 (at block 530). The electronic processor 410 receives sensor data and determines whether an obstruction is present in the path of the plunger 150. The sensor 175 may detect an obstruction, for example, within the receptacle 130, at an opening at the base of the receptacle 130, at or above the top end of the pouch, or the like. As discussed above, the sensor 175 may include an image sensor. Image recognition software may be employed to automatically compare the image data captured by the image sensor to previously stored images. For example, images taken by the image sensor may be directly compared to a stored image of the same view of the receptacle 130 without obstruction. A difference between the stored image and the captured image would indicate the presence of an obstruction. In some embodiments, filtering may be applied to identify specific colors or to prevent false identification of an obstruction. For example, if the receptacle were fully black, the presence of other colors in the receptacle would be indicative of an obstruction. In other embodiments, sensor data include other outputs from other types of sensors previously discussed (e.g., ultrasonic sensors, time-of-flight, etc.).

The method includes moving the plunger 150 to the lowered position in response to determining that an obstruction is not present in the path of the plunger 150 (at block 540). When an obstruction is not detected, the electronic processor 410 controls the plunger 150 to move to the lowered position. Lowering the plunger 150 pushes the pharmaceuticals into the pouch and also blocks the opening in the base of the receptacle 130 such that the next batch of pharmaceuticals can be received. The method 500 then proceeds to block 510 to receive the next batch of pharmaceuticals.

The method 500 includes providing an alert in response to determining that an obstruction is present in the path of the plunger 150 (at block 550). The alert may be provided on the input/output interface 440 of the control system 400. For example, an audio alert, a visual alert, a text alert, a notification, or the like may be provided to alert a user that an obstruction is present. In some embodiments, in addition to or in place of providing an alert, the control system 400 takes an action to remove the obstruction. For example, the control system 400 may activate a clearing mechanism to dislodge or displace the obstruction. The clearing mechanism includes, for example, a fan, a blower, a roller, vibration mechanism, a brush, a paddle, or the like. In other embodiments, an operator may manually remove the obstruction through the slot 132 or by operating a clearing mechanism. In some embodiments, the electronic processor 410 inhibits movement of the plunger 150 in addition to providing the alert when the obstruction is present in the path of the plunger 150.

In some embodiments, the method 500 also includes receiving an indication that the obstruction is cleared. For example, the electronic processor 410 may receive an input from a user with a button or software command to reset the system.

In some embodiments, the method 500 may further include determining whether the obstruction is present in the path, upon receiving an indication that the obstruction is cleared. Similar to methods used in block 530, the electronic processor 410 uses a sensor to determine whether the obstruction is still present.

In some embodiments, the method 500 may further include moving the plunger to the lowered position in response to determining the obstruction is not present in the receptacle. Similar to block 540, the electronic processor 410 controls the plunger 150 to move to the lowered position and the method 500 proceeds to step 510 to receive the next batch of pharmaceuticals.

In some embodiments, the method 500 may further include in response to determining the obstruction is still present in the receptacle, providing a second alert. Similar to block 550, the electronic processor 410 may provide the second alert to the input/output interface 440 of the control system 400 and prevent movement of the plunger 150.

The control system 400 also controls the packaging equipment 140 to form the pouches around the dispensed pharmaceuticals. For example, the packaging equipment 140 may form the pouch before pushing the pharmaceutical into the pouch. In other embodiments, the packaging equipment 140 may form the pouch while or after pushing the pharmaceutical.

In some embodiments, the electronic processor 410 deflates, using the deflator 340, the pouch in response to determining that the pouch is filled. The electronic processor 410 controls the deflator 340 to move along the pouch to release the air from the pouch. After the deflator 340 is operated to deflate the pouch, the electronic processor 410 controls the sealing mechanism to seal and serrate the filled pouches.

Various features and advantages of the invention are set forth in the following claims.

The invention claimed is:

1. An automatic packager for pharmaceuticals comprising:
   a receptacle configured to receive a plurality of pharmaceuticals;
   a plunger disposed adjacent the receptacle and configured to be movable between a lowered position and a raised position through the receptacle, the plunger defining a path between the lowered position and the raised position;
   a sensor configured to detect an obstruction in the path;
   packaging equipment configured to form a pouch to receive the pharmaceuticals from the receptacle;

a deflator configured to remove air from the pouch formed by the packaging equipment; and
   an electronic processor electrically coupled to the plunger and the sensor, the electronic processor configured to
      dispense pharmaceuticals for the pouch to the receptacle based on prescription information,
      move the plunger to the raised position to deliver the pharmaceuticals to the pouch,
      determine, using the sensor, whether the obstruction is present in the path,
      move the plunger to the lowered position in response to determining the obstruction is not present in the receptacle, and
      provide an alert in response to determining that the obstruction is present in the path.

2. The automatic packager of claim 1, wherein the electronic processor is further configured to:
   inhibit the plunger from moving to the lowered position in response to detecting that the obstruction is present in the receptacle.

3. The automatic packager of claim 1, wherein the sensor is a camera configured to capture an image of the receptacle.

4. The automatic packager of claim 3, further comprising a light source operably connected to the electronic processor and configured to illuminate the receptacle.

5. The automatic packager of claim 1, further comprising a clearing mechanism configured to displace the obstruction, and wherein the electronic processor is further configured to operate the clearing mechanism in response to determining that the obstruction is present.

6. The automatic packager of claim 5, wherein the clearing mechanism is one of: a fan, a blower, a roller, a brush, or a paddle.

7. The automatic packager of claim 1, wherein the deflator is one of: a sponge, a roller, or a vacuum.

8. The automatic packager of claim 1, further comprising a plurality of cartridges for dispensing the pharmaceuticals, and wherein the electronic processor is electrically coupled to the plurality of cartridges, wherein the pharmaceuticals are dispensed from the plurality of cartridges.

9. An automatic packager for pharmaceuticals comprising:
   a plurality of cartridges configured to dispense a plurality of pharmaceuticals;
   a receptacle configured to receive the plurality of pharmaceuticals from the plurality of cartridges;
   a packaging unit configured to receive the plurality of pharmaceuticals from the receptacle and form a pouch;
   a deflator configured to remove air from the pouch formed by the packaging unit;
   a valve mechanism adjacent to the receptacle configured to selectively block a path between the receptacle and the packaging unit;
   a sensor configured to detect an obstruction in the path; and
   an electronic processor in communication with the sensor and the valve mechanism configured to provide an alert in response to determining that an obstruction is present in the path.

10. The automatic packager of claim 9 further comprising a light source configured to illuminate the path.

11. The automatic packager of claim 9, wherein the sensor is a camera configured to capture an image of the receptacle.

12. The automatic packager of claim 9, wherein the valve mechanism includes an actuator and a plunger configured to move between a raised position and a lowered position.

13. The automatic packager of claim 9, further comprising a clearing mechanism configured to displace the obstruction, and wherein the electronic processor is further configured to operate the clearing mechanism in response to determining that the obstruction is present.

14. The automatic packager of claim 13, wherein the clearing mechanism is one of: a fan, a blower, a roller, a brush, or a paddle.

15. The automatic packager of claim 9, wherein the deflator is one of: a sponge, a roller, or a vacuum.

16. A method for packaging pharmaceuticals using an automatic packager, the method comprising:

providing a packaging unit of the automatic packager, the packaging unit including a receptacle configured to receive a plurality of pharmaceuticals;

providing a plunger disposed movable between a lowered position and a raised position through the receptacle, the plunger defining a path between the lowered position and the raised position;

providing a sensor configured to detect an obstruction in the path;

dispensing pharmaceuticals for a pouch, using the packaging unit, to the receptacle based on prescription information;

moving the plunger to the raised position to deliver the pharmaceuticals to the pouch;

determining, using the sensor, whether the obstruction is present in the path, moving the plunger to the lowered position in response to determining the obstruction is not present in the receptacle, providing an alert in response to determining that the obstruction is present in the path, receiving an indication that the obstruction has been cleared, determining, using the sensor, whether the obstruction is present in the path, in response to receiving an indication that the obstruction has been cleared, and in response to determining the obstruction is still present in the receptacle, providing a second alert.

17. The method of claim 16, further comprising:

inhibiting the plunger from moving to the lowered position in response to detecting that the obstruction is present in the receptacle.

* * * * *